Patented Aug. 15, 1950

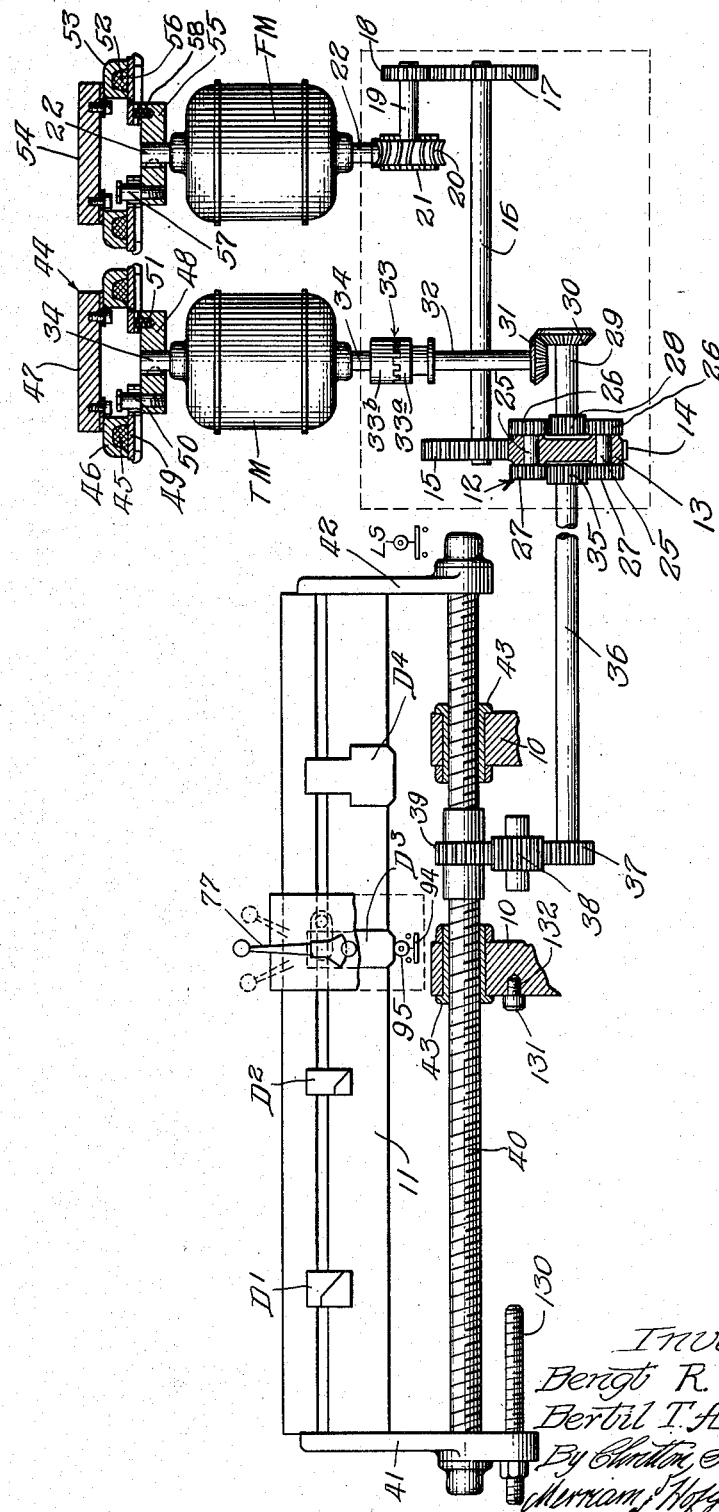

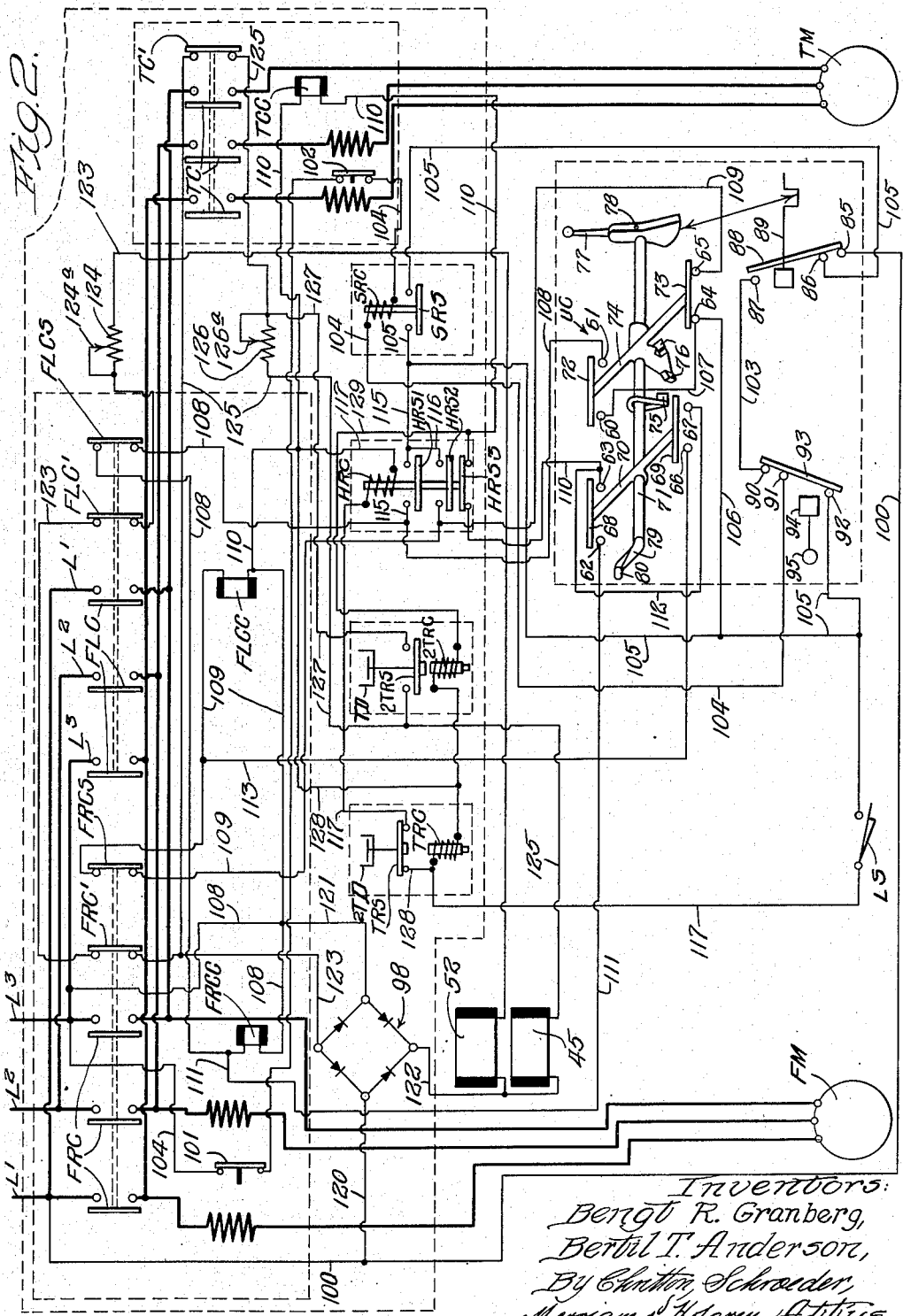

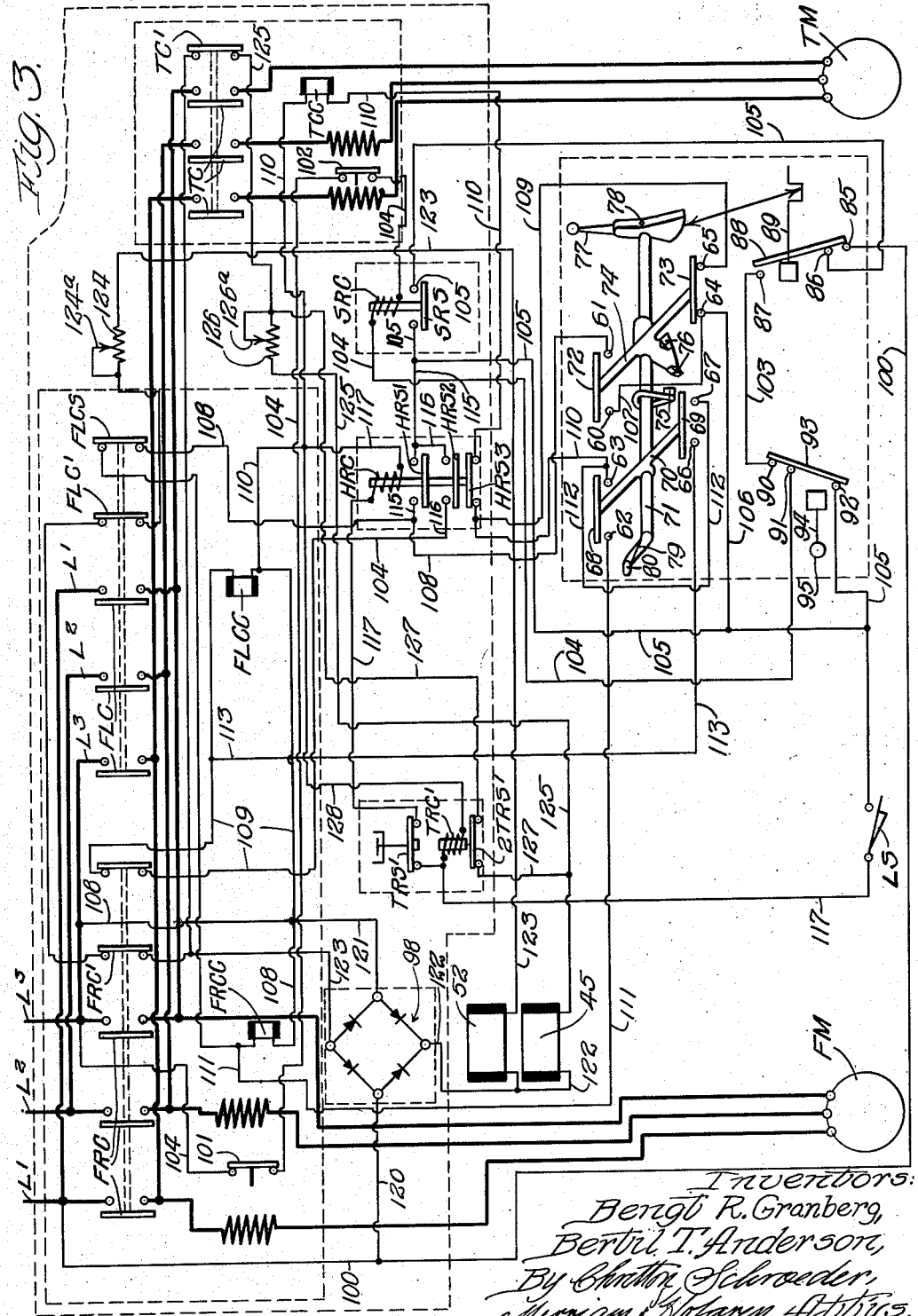

2,519,042

UNITED STATES PATENT OFFICE 2,519,042

AUTOMATIC POSITIVE STOP AND DWELL ARRANGEMENT FOR MACHINE TOOLS

Bengt R. Granberg and Bertil T. Anderson, Rockford, Ill., assignors to Sundstrand Machine Tool Co., Rockford, Ill., a corporation of Illinois.

Application October 7, 1948, Serial No. 53,212

14 Claims. (Cl. 90—21)

This invention relates generally to machine tools, and more particularly to an electrical control system for a machine tool having a movable carriage including novel means providing automatic positive stop and dwell of said carriage during the operation of a machine tool.

An object of this invention is to provide automatic positive stop and dwell operation in a machine tool having a feed motor, a rapid or traverse motor, and differential drive means for driving a carriage, wherein the traverse motor is braked during feed operation and automatic means are provided operative before the carriage engages a positive stop for reducing the braking torque on the traverse motor so that said brake will slip when the table strikes the positive stop.

Another object is to provide an improved control system wherein full braking torque is applied to the traverse motor at the initiation of the feed portion of the cycle, but before the carriage engages a positive stop the torque is automatically reduced so that the brake will slip when the carriage strikes the positive stop, the reduced torque being high enough to prevent the feed motor from driving the traverse motor before the carriage engages the stop.

A further object is to provide improved means whereby the amount of braking torque may be readily adjusted to provide that said reduced torque is high enough to prevent rotation of the traverse motor and insure feed movement of said carriage, but low enough to permit the brake to slip when the carriage engages the positive stop.

An additional object is to provide improved braking means for the feed and traverse motors, including means for readily adjusting the torque of such braking means.

Other objects and advantages will become apparent from the following detailed description taken in connection with the accompanying drawings, in which:

Fig. 1 is a diagrammatic view of a work support and driving motor and gearing therefor adapted to be controlled by an electrical control system herein disclosed;

Fig. 2 is a diagrammatic view of an electrical control system including in one embodiment the features of this invention;

Fig. 3 is a diagrammatic view of an electrical control system including in another embodiment the features of this invention.

While the invention is susceptible of various modifications and alternative constructions, it is here shown and will be described hereinafter in two embodiments. It is not intended, however, that the invention is to be limited to the specific forms disclosed, but on the contrary, it is intended to cover all modifications and alternative constructions falling within the spirit and scope of the invention as defined by the appended claims.

Though the invention may be embodied in a variety of machine tools, it is for purposes of disclosure, illustrated in the drawings and will hereinafter be described as embodied in a milling machine, by way of example, a machine similar to that described in the patent to Bengt R. Granberg, No. 2,203,298 dated June 4, 1940. A machine of that character has a base or bed fragmentarily shown at 10 in Fig. 1 upon which a work supporting carriage or table 11 is reciprocable in ways of conventional construction. Such a machine also has a tool support, usually in the form of a spindle. Inasmuch, however, as the spindle or its control apparatus form no part of this invention, no disclosure thereof is made herein.

As is well known to those skilled in the art, the carriage 11 is usually reciprocated through a cycle including various combinations of rapid or traverse movements and feed movements. Herein the drive means for the carriage 11 is such that it may be driven both at a feed and a traverse rate of movement in either direction. Accordingly, there is provided a reversible electric feed motor FM and a reversible electric rapid or traverse motor TM each adapted to be started and stopped to start and stop movement of the carriage 11, and to be reversed to reverse the direction of movement of the carriage 11. These motors are connected to drive the carriage through a differential drive arrangement here illustrated as a planetary gear device generally designated at 12. This gear device comprises a planet gear carrier 13 having teeth 14 formed on the periphery thereof. Meshing with the teeth 14 is a gear 15 fixed on one end of a shaft 16, the other end of which carries a gear 17 of a set of pick-off gears. The remaining gear 18 of this set is fixed on one end of a shaft 19, the other end of which carries a worm wheel 20 which meshes with a worm 21 fixed on the projecting end of the armature shaft 22 of the feed motor FM. The pick-off gears 17 and 18 are in well known manner changeable to vary the drive ratio of the feed motor.

A plurality of stub shafts 25 are rotatably journalled in the planet gear carrier 13, these shafts being spaced outwardly equal distances from the center of the planet gear carrier 13. Fixed on one end of each shaft are the respective planet gears 26 and fixed on the opposite end of each shaft are the respective planet gears 27. The planet gears 26 are in constant mesh with a sun gear 28 fixed on one end of a shaft 29, the other end of which carries a bevel gear 30. Meshed with the bevel gear 30 is a complementary bevel gear 31 fixed on the end of a shaft 32 which shaft carries on its other end the shiftable element 33a of a clutch 33. Another element 33b of the clutch is fixed on the armature shaft 34 of the rapid or traverse motor TM. The planet gears 27, on the other hand, mesh with a sun gear 35 fixed on the end of a shaft 36 carrying a gear 37 on its other end. This gear in turn meshes with an idler gear 38 on the frame 10 which idler gear meshes with a drive gear 39 splined on a screw shaft 40 mounted to drive the carriage 11. The mounting of the gear 39 prevents rotation of the gear with respect to the shaft but permits relative movement of the two elements axially of said shaft. Herein the screw shaft 40 is shown as being journalled at its ends in depending portions 41 and 42 of the carriage 11, and intermediate its ends the screw shaft threadably engages nuts 43 nonrotatably mounted on the base 10. The driving gear 39 is also journalled in the bed and is held against longitudinal movement.

The carriage 11 is started and stopped at the beginning and ending of a cycle of movement by starting and stopping the feed and traverse motors, and is reciprocated alternately in opposite directions by reversing the direction of rotation of the motors. A feed rate of movement of the carriage is obtained by operation of the feed motor while the traverse motor is held stationary, while rapid or traverse rate of operation of the carriage 11 is obtained by operation of the traverse motor with or without the feed motor being stationary. The worm 21 and the worm wheel 20 in the drive train from the feed motor to the planetary gear device serve as means preventing the feed motor from being driven through the planetary gear device during traverse movement of the carriage should the feed motor be deenergized, although in the structure illustrated the feed motor normally is running during traverse movement.

Braking means for the traverse motor TM are designated generally at 44, this braking means comprising an electromagnet coil 45 in the form of a torus carried in a magnet housing 46 which is bolted onto a stationary member 47 fastened to the frame 10 of the machine. An armature 48 is secured to a projecting end of the motor shaft 34, this armature having an armature plate 49 secured thereto by pins 50, the structure including springs 51 for pressing the armature plate against the magnet housing 46. Similarly the brake for the feed motor comprises a torus shaped electromagnet coil 52 in a housing 53 bolted to a stationary member 54, and an armature 55 having an armature plate 56 secured thereto by pins 57 and urged against the coil housing by springs 58. The brakes are applied by energization of the respective electromagnet coils 45 and 52 as will be described in connection with Fig. 2.

To control the starting, reversing and stopping of the feed motor and the traverse motor and the energization of the brake electromagnets to obtain the desired cycle of operation of the carriage, the control systems hereafter described are provided. In addition to providing for conventional feed and traverse movements in either forward or reverse direction this invention includes novel means to provide for positive stop and dwell of the electrically driven and controlled carriage. As to this feature the two control systems about to be described are common, though the particular manner of obtaining the desired end varies in each system. The systems are also common in many other respects and to the degree practical the common constructions of the systems will be described before each system is treated in detail and alone. Many common features of the systems are similar to the apparatus disclosed in the patent to Bertil T. Anderson, No. 2,398,346, issued April 16, 1946.

In both of the systems the feed motor FM and the traverse motor TM are connected in parallel and are primarily controlled as to starting and stopping and as to direction of rotation by means of a feed right contactor including three normally open switches FRC connected in the power line wires and two normally closed switches FRC' and FRCS connected in the control portion of the system, and a feed left contactor including three normally open switches FLC connected in the reverse manner in the power line wires and two normally closed switches FLC' and FLCS connected in the control portion of the system. The switches FRC and FLC are interposed in well known manner between the motors and the line wires of the power supply which herein is illustrated as a three wire system comprising line wires L1, L2 and L3. The traverse motor is further and independently controlled as to starting and stopping by means of a traverse contactor including three normally open switches TC in the power circuit and a normally closed switch TC' in the control circuit. The switches TC function to interrupt the circuit to the traverse motor without disturbing the feed motor circuit for the purpose of obtaining a feed rate of movement of the carriage 11 and to complete the circuit to the traverse motor for obtaining a traverse rate of movement of said carriage. As shown in Fig. 2 this traverse contactor is interposed between the traverse motor and the feed right and feed left contactors so that direction of rotation of the traverse motor will be under control of the feed right and feed left contactors the same as the feed motor, but starting and stopping of the traverse motor is controlled by the traverse contactor and the traverse motor may be deenergized without deenergizing the feed motor.

The left and right contactors for the feed and traverse motors and the traverse contactor are actuated electrically by means respectively of a feed right contactor coil FRCC, a feed left contactor coil FLCC and a traverse contactor coil TCC. In addition to the coils just described there is an actuating coil SRC for a starting relay having a single normally open switch SRS. There is also an actuating coil HRC for what will herein be termed a holding relay having three switches HRS1, HRS2 and HRS3, the first two normally open and the third being normally closed. In the circuit of Fig. 2 only, two timer relays are provided, the first having an actuating coil TRC and a single normally closed switch TRS, and the second having an actuating coil 2TRC and a normally open switch 2TRS.

Forming a part common to both systems is a unitary controller UC providing combined manual and automatic actuation and constituting the primary control means of the system. This unitary controller is shown diagrammatically in Figs. 2 and 3 and in end elevation in Fig. 1 and comprises a first control means including a plurality of switches associated with the feed left and feed right contactor coils and with the traverse contactor coil, thereby constituting a rate and direction control; a second control means including a plurality of switches adapted to be manually actuated and associated with the starting relay coil SRC and thereby constituting a start and stop control; and a third control means including switches adapted to be automatically actuated and also associated with the starting relay coil and constituting a limit or automatic stop control. The unitary controller is claimed and described in detail in the Granberg Patent 2,203,297 dated June 4, 1940. It is believed, however, that the physical construction of the controller to the extent required for an understanding of this invention may be understood from the present disclosure wherein the function and operation are clearly set forth.

The rate and direction control is both manually and automatically operated, and, moreover, is operable independently of the start and stop control and the automatic stop and limit control, and serves to condition the control circuit preparatory to initiation of operation of the drive means for the carriage. As previously stated, the rate and direction control comprises a plurality of switches associated with the feed right and feed left contactor coils and the traverse contactor coil. These switches are four in number as clearly seen in Figs. 2 and 3, each consisting of two stationary contacts and a movable contact adapted to bridge the two stationary contacts. Two pairs of stationary contacts 60, 61 and 62, 63 are mounted in spaced relation longitudinally on one side of the controller. An additional two pairs of stationary contacts 64, 65 and 66, 67 are similarly mounted, but on the opposite side of the controller.

A movable contact 68 adapted to cooperate with the stationary contacts 62, 63 and a movable contact 69 adapted to cooperate with the stationary contacts 66, 67 are mounted on opposite ends of a T-shaped bracket 70 pinned to an oscillatable or rockable shaft 71 extending longitudinally of the controller and journalled in the end walls of the casing which houses the controller. Similarly, a movable contact 72 and a movable contact 73 are mounted on opposite ends of a T-shaped bracket 74 which is loosely mounted upon the shaft 71. The contacts 72 and 73 are adapted to cooperate respectively with the stationary contacts 60, 61 and 64, 65. Though not shown here, each of the movable contacts 68, 69, 72 and 73 in practice is preferably yieldably mounted on the respective brackets 70 and 74. The bracket 70 has three positions, namely, a neutral position, which is that shown in Figs. 2 and 3 and in which both movable contacts 68 and 69 are disengaged from the stationary contacts, and an extreme position on either side of neutral in which one of the switches is closed by engagement of one of the movable contacts with its cooperating stationary contacts, while the other switch remains open depending into which extreme position the bracket is swung. The bracket 74 has but two positions, namely, a right position and a left position. With the bracket in its left position as shown in Figs. 2 and 3 movable contact 73 engages and bridges contacts 64, 65 while movable contact 72 is disengaged from its cooperating stationary contacts. When the bracket 74 is swung to its right position just the reverse is true. The brackets are yieldably retained in their various positions by suitable means, such as star wheel portions each formed with the requisite number of notches and engaged by spring pressed followers.

It has been previously stated that the bracket 70 is pinned to the shaft 71 while the bracket 74 is loose upon the shaft. In order to obtain the requisite movements of the brackets 70 and 74 which particularly adapts the controller for use with machine tools and for the systems herein disclosed, the bracket 74 is actuated upon rocking the shaft 71 through a lost motion connection. This lost motion connection is of such a nature that when the shaft is rocked to swing the bracket 70 to either extreme position the bracket 74 also is swung in the same direction, but when the bracket 70 is merely returned from either extreme position to its neutral position, no movement is imparted to the bracket 74. This lost motion connection comprises an actuating lug 75 disposed centrally on the shaft 71 with respect to the bracket 70 and extending axially to project between spaced follower lugs 76 carried by the bracket 74 and extending axially so as to overlap the lug 75. It will be seen with the foregoing arrangement that upon rocking the shaft 71 to swing the bracket 70 to its extreme position in a clockwise direction as viewed from the right end in Figs. 2 and 3, contacts 68 and 72 will engage their respective stationary contacts and the shaft 71 may then be rocked in a counter-clockwise direction to swing the bracket 70 counter-clockwise to its neutral position, thereby disengaging movable contact 68 while contact 72 remains in bridging engagement with its contacts 60, 61. Similarly the bracket 70 may be swung to its extreme position in the opposite direction and then returned to neutral in which event it will carry with it the bracket 74 when swung to the extreme position, but will not carry with it the bracket 74 when returned to its neutral position, leaving the parts in the position illustrated.

In order that the shaft 71 may be rocked both manually and automatically, it projects from both ends of the casing of the controller, and at its right hand end, as viewed in Figs. 2 and 3 (this end being herein called the forward end) the shaft carries a lever 77 secured to the shaft 71 by a pivot pin 78 extending diametrically of the shaft so that the lever 77 is held against rotation relative to the shaft but is pivotal in the plane of the shaft. At the opposite or rear end the shaft 71 has nonrotatably secured thereto an arm 79 carrying a follower 80 for actuation by dogs mounted on the carriage 11 as will be hereafter described.

The manual start and stop control means is designed to be actuated by the lever 77 through the pivoting of the lever about the axis of the pin 78 and thus independently of the rotational movement of the lever for rocking the shaft 71 in actuating the rate and direction control. To that end the manual start and stop control comprises two switches formed by three stationary contacts 85, 86 and 87 and a movable contact 88 in the form of a tiltable plate provided with contact points positioned to cooperate with said stationary contacts. The particular construction of this switch means is fully disclosed in the Granberg Patent No. 2,203,297 above mentioned. Suffice it to say, therefore, that the movable contact 88 is normally so held as to be in engagement with stationary contacts 85 and 86 but out of engagement with contact 87 and, through the movement of a plunger 89 which is actuated by the lever 77 as diagrammatically shown the plate 88 may be caused to engage contact 87 while still engaging contacts 85 and 86, or to be disengaged from all three contacts. Movement of the plunger 89 to the left as viewed in Figs. 2 and 3 causes engagement of the movable contact 88 with the contact 87 while movement of said plunger to the right results in breaking all of the switches controlled by the movable contact 88.

At the opposite end of the controller is the automatic stop or limit control means. Like the manual start and stop control this automatic control comprises two switches formed by three stationary contacts 90, 91 and 92, and a movable contact 93 in the form of a plate. Here again suffice it to say that the movable contact 93 has a normal position in which it is in engagement with all three stationary contacts as illustrated and that said movable contact is adapted to be actuated by a plunger 94 to be disengaged from the stationary contact 92 while remaining in engagement with the contacts 90 and 91, or to be disengaged from all three contacts 90, 91, 92. The plunger 94 carries a follower 95 for actuation by dogs on the carriage. This construction is also more fully disclosed and claimed in the aforementioned Granberg Patent No. 2,203,297.

While the structure above described is similar to the structure found in Anderson Patent No. 2,398,346 above noted, in the system disclosed herein the feed brake electromagnet coil 52 and the rapid brake electromagnet coil 45 are connected in a circuit adapted to be energized from a diamond-connected rectifier arrangement designated generally at 98 and designed to provide 90 volts D. C. Having described the contactors, relays, unitary controller, switches, etc. common to both embodiments of the invention disclosed, the specific connection of these parts in the control circuit will now be described. Turning first to the form of the invention shown in Fig. 2, there extends from the line wire L1 a lead 100 connected to the stationary contact 85. Interconnecting the stationary contacts 87 and 90 is a lead 103 forming part of a start or initiating circuit, and another lead 104 forms part of this same circuit and is connected at one end to the stationary contact 91 and at the other end to the line wire L3, the lead 104 incorporating the coil SRC of the start relay and series connected thermal overload safety switches 101 and 102.

This starting circuit includes the normally closed switch formed by the stationary contacts, 90, 91 and the movable contact 93 of the automatic stop control means, the normally closed switch formed by the stationary contacts 85, 86 and the movable contact 88 of the manual start and stop control means, and the normally open switch of that same means formed by the stationary contact 87 and the movable contact 88. Thus it will be seen that if the lever 77 is pivoted to move the plunger 89 to the left the switch 87, 88 will be closed, thereby completing a starting circuit and energizing the coil SRC of the starting relay. This relay, as already stated, has a single normally open switch SRS which will be closed upon energization of the relay coil. The switch SRS is in a lead 105 connecting the stationary contacts 86 and 92, the lead 105 together with the switch SRS completing a holding circuit for the coil SRC that may be traced as follows: line wire L1; lead 100; closed switch 85, 86, 88; lead 105 with the now closed switch SRS; normally closed switch 91, 92, 93; and lead 104 to line wire L3. With this arrangement if the lever 77 is pivoted to close the switch 87, 88 and energize the coil SRC, closure of the switch SRS forms a holding circuit around the switch 87, 88, and this holding circuit remains closed as long as switches 85, 86, 88 and 92, 93 remain closed.

In addition to controlling this holding circuit for the coil SRC of the start relay, the switch SRS also controls all of the other subcircuits of the control circuit proper. To that end there is connected in the lead 105 beyond the switch SRS (that is intermediate the switch and the stationary contact 92) a lead 106 which extends to the stationary contact 64 of the unitary controller. Contact 64 is interconnected with contact 60 of the controller by a lead 107. The remaining contact 61 of the pair of contacts 60, 61 is by a lead 108 connected to the line wire L3 and has incorporated therein the coil FRCC of the feed right contactor FRC and the normally closed switch FLCS of the feed left contactor.

The coil FLCC of the feed left contactor is connected in a sub-circuit generally parallel with that of the feed right contactor coil and comprising a lead 109 connected at one end to the stationary contact 65 and at the other end to the lead 108 adjacent line wire L3. This lead has incorporated the normally closed switch FRCS of the feed right contactor and the coil FLCC of the feed left contactor. Also under the control of the unitary controller UC and generally parallel with the sub-circuits including the feed right and feed left contactor coils is a sub-circuit for the traverse contactor coil TCC. This circuit is formed by a lead 110 connected at one end to the line wire L3 (through leads 108 and 109) and at the other end to the stationary contact 63 and having incorporated therein the coil TCC and the normally closed switch HRS3. Stationary contact 62 is by lead 111 connected to the lead 108 intermediate the feed right contactor coil FRCC and the feed left contactor switch FLCS to complete a circuit for the energization of the traverse contactor coil when the unitary controller is swung to the extreme position wherein the movable contact 68 bridges the stationary contacts 62, 63. Stationary contact 63 is also connected to stationary contact 67 by a lead 112, while contact 66 is by a lead 113 connected to the lead 109 intermediate the feed left contactor coil FLCC and the feed right contactor switch FRCS to complete a circuit for energizing the traverse contactor coil TCC when the unitary controller is swung to the extreme in the opposite direction, causing the movable contact 69 to bridge stationary contacts 66, 67.

It is believed apparent from the above that by rocking the shaft 71 through the medium of the lever 77 the unitary controller is operable to precondition the control system to bring about movement of the carriage 11 in either direction and at either feed or traverse rate at the time the plunger 89 is moved to the left to permit completion of the starting circuit by closure of the contacts 87, 88. Switch 60, 61, 72 conditions the system for operation to the right; switch 64, 65, 73 conditions the system for operation to the left; and switches 62, 63, 68 and 66, 67, 69 determine the rate of movement, closure of the selected one of said switches providing for traverse movement, and opening of said selected switch providing for feed movement. Thus if the shaft 71 is rocked to its extreme position, for example, to the right as viewed from the right in Fig. 2 so that both the movable contacts 68 and 72 will engage and bridge their respective stationary contacts, circuits will be conditioned to energize both the feed right contactor coil FRCC and the traverse contactor coil TCC if, while in that position the lever 77 is pivoted to move the plunger 89 to the left closing the switch 87, 88. Such energization of these coils will in turn cause closure of the feed right contactor FRC and the traverse contactor switches TC and thus cause operation of both the feed and traverse motors to drive the carriage at a traverse rate to the right as viewed in Fig. 1. Had the unitary controller been returned to its neutral position so that the movable contact 68 no longer bridged stationary contacts 62, 63 before the plunger 89 was actuated only the feed right contactor coil FRCC would have been energized since the energizing circuit for the traverse contactor coil TCC includes the switch 62, 63, 68, and hence in such event only the feed right contactor FRC would have closed, with the result that the carriage would have been driven at a feed rate to the right as viewed in Fig. 1. Conversely, if the unitary controller is swung to its extreme in the opposite direction (counterclockwise as viewed from the right in Fig. 2), movable contacts 69 and 73 will bridge contacts 66, 67 and 64, 65, respectively, and will condition circuits for the traverse contactor coil TCC and for the feed left contactor coil FLCC. These last mentioned circuits may be traced as follows: line wire L3; lead 108; lead 109 including feed left contactor coil FLCC and switch FRCC; switch 64, 65, 73; lead 106; lead 105; switch 90, 92, 93; lead 103; switch 85, 87, 88; and lead 100 to line wire L1. If switch 92, 93 or switch 87, 88 is open, and if coil SRC has been previously energized the holding circuit through that portion of the lead which incorporates the switch SRS shorts around the above mentioned open circuits. The circuit for coil TCC is as follows: line wire L3; lead 110 including traverse contactor coil TCC; and switch HRS3; lead 112; switch 66, 67, 69; lead 113; lead 109 (including switch FRCS); switch 64, 65, 73; lead 106; lead 105; switch 90, 92, 93; lead 103; switch 85, 87, 88; and lead 100 to line wire L1.

It will be seen that with the parts in this position and the switch 87, 88 closed these coils will be energized and the feed left contactor switches FLC and the traverse contactor switches TC closed to drive the carriage at a traverse rate, but this time to the left as viewed in Fig. 1 because the direction of rotation of the motors has been reversed due to the supply of power thereto through the feed left contactor rather than the feed right contactor. Again movement of the carriage to the left at a feed rate might be initiated if the unitary controller were returned to neutral position to break the circuit for the traverse contactor coil at the switch 66, 67, 69 while preserving the circuit for the feed left contactor coil through switch 64, 65, 73. It will be understood, of course, that operation of the motor may be arrested at any time by manual shift of the plunger 89 to the right as viewed in Figs. 2 and 3 thereby breaking the holding circuit for the starting relay at the switch 85, 86, 88. Similarly, the operation may be arrested automatically by shift of the plunger 94 to the right, breaking the holding circuit at the switch 91, 92, 93. The plunger 94, as previously mentioned and as will hereinafter be more fully described is adapted to be actuated by dogs on the carriage 11.

The circuit illustrated provides an arrangement whereby, while the carriage continues to be driven at a feed rate in one direction, the unitary controller may be actuated to precondition the system for traverse movement of the carriage in the opposite direction. To that end, holding circuits are provided for the feed right and feed left contactor coils. These holding circuits are under the control of the holding relay HRC, and more particularly under the control of its two normally open switches HRS1 and HRS2. The holding circuit for the feed right contactor coil comprises simply a single lead 115 connected at one end to the lead 105 intermediate stationary contact 92 and switch SRS, and connected at the other end to the lead 108 intermediate the stationary contact 61, and the feed left contactor switch FLCS and having incorporated therein the holding relay switch HRS1. The holding circuit for the feed left contactor coil comprises a single lead 116 having incorporated therein the switch HRS2 and being connected at one end to the lead 115 intermediate the lead 105 and the switch HRS1, and at the other end to the lead 109 intermediate the contact 65 and the feed right contactor switch FRCS. The energizing circuit for the coil HRC of the holding relay comprises a lead 117 connected at one end to the lead 105 intermediate stationary contact 92 and switch SRS, and at the other end to the line wire L3 through a portion of leads 110, 109 and 108. This lead has incorporated therein a dog-actuated normally open limit switch LS and a normally closed timer relay switch TRS.

As previously stated, the primary object of this invention is to provide improved means for obtaining positive stop and dwell in an electrically driven and electrically controlled system. This object is attained through the provision of a variable torque brake for the traverse motor whereby, in Fig. 2, full torque is applied at the beginning of the feed operation and after a short time delay the torque is reduced. At this point in the feed operation the torque is high enough to allow the feed movement of the table but low enough so that when the table hits the positive stop the brake for the traverse motor begins to slip so that the carriage is held against the positive stop by continued operation of the feed motor, but injury to the mechanism is prevented by permitting the feed motor to drive the traverse motor during the period of the dwell. In order to attain this object the magnetic brake for the traverse motor is provided together with novel means for operating the brake apparatus.

Referring again to Fig. 2 the rectifier 98 has its input terminals connected across the power line, a lead 120 connecting one side of said rectifier to the line wire L1 through a portion of the lead 100, and a lead 121 connecting the other side of said rectifier to the line wire L3 through a portion of the lead 108. A first output terminal of the rectifier is connected by means of a lead 122 directly to one side of the feed brake electromagnet coil 52 and the rapid brake electromagnet coil 45 in parallel, and the other output terminal of the rectifier is connected to said coils through a parallel circuit. The portion of this circuit which connects to the feed brake electromagnet coil 52 comprises a lead 123 which incorporates in series the fourth normally closed switch FRC' associated with the feed right contactor, the fourth normally closed switch FLC' associated with the feed left contactor, and a variable torque adjustment resistor 124. The portion of this circuit which connects to the traverse brake electromagnet coil 45 comprises a lead 125 connected to said first output terminal through the lead 123 and incorporating in series the fourth normally closed switch TC' associated with the traverse contactor, and a torque adjustment resistor 126. A subsidiary parallel circuit for shunting around this last mentioned resistor includes a lead 127 which is connected to the lead 125 on either side of the resistor 126 and which has incorporated therein the normally open switch 2TRS of the second timer.

It will be obvious that when the feed right contactor coil FRCC and the feed left contactor coil FLCC are both deenergized the switches FRC' and FLC' will be closed and the feed brake electromagnet coil 52 will be energized, applying braking torque to the feed motor in an amount depending upon the adjustment of the resistor 124. This adjustment is readily made by moving the slider 124a, and the higher the resistance in the circuit the lower the braking torque will be. Similarly, whenever the traverse contactor coil TCC is deenergized the switch TC' will be closed and the rapid brake electromagnet coil 45 will be energized, and the degree of energization and consequently the amount of torque applied by the brake assembly 44 to the traverse motor will depend upon the adjustment of the slider 126a on the variable resistor 126. However, it will be noted that in this circuit that whenever the switch 2TRS is closed the lead 127 shunts around the resistor 126 and effectively removes it from the circuit so that the full voltage output of the rectifier is applied across the coil 45. The energizing circuit for the coil TRC comprises a lead 128 incorporating said coil therein and connected at one end to the lead 117 intermediate the switches LS and TRS and connected at the other end to the line wire L3 through the leads 110, 109 and 108. The energizing circuit for the coil 2TRC comprises a lead 129 incorporating said coil therein and connected at one end to line wire L3 through leads 129, 110, 109 and 108, and connected at the other end to lead 110 intermediate coil TCC and switch HRS3.

Having described the elements of the system it is believed that the invention can be further clarified and rendered more readily understandable by a brief description of the operation of this form of the invention. It is to be understood, of course, that a great number of different cycles of operation are attainable with the system herein disclosed. These cycles may be arranged to obtain the so-called skip-feed milling, or the so-called double end milling and it is to be understood that the invention is not to be limited to the one cycle hereafter employed by way of exemplary disclosure. For example, let it be assumed that the carriage 11 is to have a cycle composed of a traverse movement to the right, followed by a feed movement to the right, a dwell, and then a reversal and a traverse movement to the left back to its initial starting position. Under these conditions the left end of the carriage as seen in Fig. 1 will have adjustably mounted thereon a positive stop screw 130. Positioned to be abutted by the screw to hold the carriage against further movement to the right is a steel plug 131 having a reduced portion 132 inserted into a recess formed in the base 10 of the machine. Four dogs D1, D2, D3 and D4 are mounted on the carriage 11 and are suitably spaced longitudinally of the carriage. The dogs D1 and D2 are designed to act upon the follower 80 carried on the shaft 71 of the unitary controller UC. The dog D1 functions to rock the controller from its feed right position wherein both the switches 62, 63, 68 and 66, 67, 69 are open, but the switch 60, 61, 72 is closed, to its traverse left position wherein the switches 66, 67, 69 and 64, 65, 73 are closed. The dog D2 functions to rock the unitary controller from its traverse right position to its feed right position wherein both switches associated with the arm 70 are open but the switch 60, 61, 72 is closed. The dog D3 is adapted to engage the follower 95 on the plunger 94 and cause opening of the switch 91, 92, 93 which will arrest operation of the motors and bring the carriage to a stop. These dogs, in terms of their functions may be known respectively as the traverse left dog, the feed right dog, and the stop dog. The dog D4 acts to control the limit switch LS and is so positioned as to close this switch just a brief interval prior to engagement of the stop screw 130 with the plug 131 and also prior to engagement of the dog D1 with the follower 80 of the unitary controller, and to maintain the limit switch closed during the dwell period and until traverse movement to the left has been initiated.

Let it be assumed, therefore, that the carriage 11 is in its normal or stop position shown in Fig. 1 and that the dogs D1, D2, D3 and D4 have been set up to produce the cycle above described. To initiate movement of the carriage 11 to the right at a rapid or traverse rate the operator grasps the lever 77 and swings the same to its extreme right position (clockwise looking from the right in Fig. 2) to condition energizing circuits for the feed right contactor coil FRCC and the traverse contactor coil TCC by closure of the switches 60, 61, 72 and 62, 63, 68, respectively. The circuits may be traced as follows: lead 100, closed switch 85, 86, 88, lead 105 containing the normally and hence now open switch SRS of the starting relay, lead 106, lead 107, switch 60, 61, 72, and lead 108 containing the now closed switch FLCS of the feed left contactor and coil FRCC of the feed right contactor; leads 100 and 108 being connected respectively to line wires L1 and L3. The circuit for the traverse contactor coil TCC is common with the circuit for the feed right contactor coil to the point beyond the feed left contactor switch FLCS where lead 111 branches off to the stationary contact 62. The circuit for the traverse contactor coil is completed through the switch 62, 63, 68 and the lead 110 which incorporates the normally closed switch HRS3 and the traverse contactor coil TCC beyond which said lead is connected to the line wire L3.

Because of the presence of the open switch SRS in the common portion of these conditioned circuits the feed right and traverse contactors are, of course, not caused to close and hence no operation of the motors and no movement of the carriage takes place. While still holding the lever 77 swung to its extreme clockwise position as above described the operator pulls the top of the lever toward him to force the plunger 89 to the left in Fig. 2 and close the starting switch by engagement of the contact 87 by the movable contact 88. This completes the energizing circuit for the starting relay coil SRC which circuit may be traced as follows: line wire L1, lead 100, switch 85, 87, 88, lead 103, the closed switch 90, 91, 93, and lead 104 through the coil SRC and the safety switches 101 and 102 to line wire L3. It is to be noted that this starting circuit may be completed even though the dog D3 still holds the plunger 94 depressed to break the holding circuit for the starting relay coil at the contact 92, for the starting circuit remains closed through the switch 90, 91, 93. Energization of the relay coil SRC closes the switch SRS which completes the preconditioned circuits to the feed right contactor coil FRCC and the traverse contactor coil TCC thereby initiating operation of both the feed and the traverse motors in such direction as to cause movement of the carriage at a traverse rate to the right. At the same time it will be noted that the switches FRC' and TC' are opened upon the energization of the respective coils FRCC and TCC, releasing the brake on both the feed and traverse motors and that coil 2TRC is energized, its circuit being common with that of the coil TCC to a point intermediate closed switch HRS3 and coil TCC and then branching off through lead 129, coil 2TRC, lead 128, and leads 110, 109 and 108 to line wire L3. Energization of coil 2TRC closes switch 2TRS and closes shunt lead 127 around resistor 126. With the first movement of the carriage to the right, the dog D3 releases the plunger 94 and the movable element 93 of the automatic control means engages the stationary contact 92 to complete the holding circuit for the start relay coil so that the operator may release the lever 77.

The carriage will continue its movement to the right at a traverse rate until the dog D2 engages the follower 80 and rocks the shaft 71 of the unitary controller to its feed right position wherein the switch 62, 63, 68 is opened, but the switch 60, 61, 72 remains closed. This action breaks the circuit to the traverse contactor coil TCC and the timer coil 2TRC because the switch 62, 63, 68 between the leads 110 and 111 is open, but because of the lost motion connection between the lug 75 fixed on the shaft 71 and the lugs 76 on the bracket 74 this return of the shaft to its neutral position does not affect the bracket 74 and hence the carriage will move to the right at a feed rate.

When the feed portion of the cycle is initiated as above described by opening the switch 62, 63, 68 the coil 2TRC is deenergized as noted but the switch 2TRS remains closed during the delay period of the timer mechanism so the shunt circuit through the lead 127 is not broken until after this delay period. When the coil 2TRC is deenergized, the core thereof returns to its position as shown in Fig. 2, thereby allowing the switch 2TRS to open; said switch is retained closed by the timing device shown diagrammatically as T. D. until the passing of a predetermined time. Furthermore, it will be noted that deenergization of the traverse contactor coil TCC results in closure of the switch TC', thereby completing a circuit to energize the rapid brake electromagnet coil 45, this circuit extending from the rectifier 98 through lead 123, lead 125, switch TC', shunt lead 127, switch 2TRS, lead 125, electromagnet brake coil 45, and lead 122 back to the rectifier. Inasmuch as the switch 2TRS was closed there was a short circuit through the lead 127 around the resistor 126 and the coil 45 was energized with the full rectifier voltage to apply full torque to the traverse motor, thereby insuring quick stopping of this motor and instantaneous reduction of speed of the table 11 from the traverse speed to the desired feed speed. Shortly thereafter upon the operation of the mechanical timer mechanism the switch 2TRS will open, breaking the lead 127 and removing the short around the resistor 126 and placing said resistor in series in the circuit with the coil 45. The torque is now reduced to a value which is still high enough to insure movement of the table but low enough to insure that when the table is positively stopped the feed motor will drive the traverse motor, the brake slipping for this purpose. Adjustment of the slider 126a may be made at any time to increase or decrease this torque.

While the carriage is moving to the right at a feed rate, and at a suitable time prior to engagement of the dog D1 with the follower 80, the dog D4 closes the timer dwell or limit switch LS. Closure of the limit switch will energize the coil HRC of the holding relay and this relay will in turn establish a holding circuit for the feed right contactor coil FRCC independent of the unitary controller, and thus permit conditioning of the unitary controller for reversal of the carriage and movement to the left at a traverse rate, though the carriage continues in its movement to the right until the stop screw 130 engages the member 131 to provide a positive stop. The circuit for the holding relay coil HRC may be traced as follows: lead 100; closed switch 85, 86, 88; lead 105 containing the now closed switch SRS; lead 117 containing the now closed limit switch LS, the normally closed timer relay switch TRS and coil HRC; and leads 110, 109 and 108 to line wire L3. The holding circuit for the feed right contactor coil may be traced as follows after energization of the holding relay: lead 100 to 105 as just traced; lead 115 branching from the lead 105 and containing the now closed switch HRS1 of the holding relay; and lead 108 containing the still closed switch FLCS of the feed left contactor and the feed right contactor coil FRCC. A similar holding circuit for the feed left contactor coil FLCC is under the control of the second switch HRS2 of the holding relay and is composed of the lead 116 which incorporates the last named switch. Though the switch HRS2 is now closed, energization of the feed left contactor coil FLCC cannot take place because the switch FRCS of the feed right contactor coil is still open. Also as a result of the operation just described the third switch HRS3 on the holding relay is opened, and it is impossible to energize the traverse contactor coil TCC or the second timer relay coil 2TRC so long as this condition is maintained. Furthermore, the coil TRC of the first timer was energized upon closure of the limit switch LS since this coil is connected between line wire L3 and lead 117 by leads 108, 109, 110 and 128, and the timer 2TD, which is similar to the device TD, starts to run. However, the switch TRS does not open immediately upon energization of coil TRC, but its opening is controlled by the timer mechanism.

Following closure of the limit switch LS and while switch TRS remains closed, the dog D1 comes into play and rocks the shaft 71 of the unitary controller to its extreme left position as viewed in Fig. 1. As a result the unitary controller conditions circuits for the feed left contactor coil and the traverse contactor coil. These circuits may be traced as follows: lead 100; manual stop switch 85, 86, 88; lead 105 containing the now closed switch SRS; lead 106; the now closed switch formed by the contacts 64, 65, 73; and lead 109 containing feed left contactor coil FLCC and also containing the still open feed right contactor switch FRCS. The circuit for the traverse contactor coil is common to a point beyond the switch FRCS where it branches off from the lead 109 and is composed of a lead 113; now closed switch 66, 69, 67; lead 112; and lead 110 incorporating the now open switch HRS3. These circuits are not completed because the feed right contactor switch FRCS connected in the common portions of both circuits is still open, and as mentioned earlier the open switch HRS3 prevents the coil TCC from being energized. This positioning of the unitary controller in its traverse left position while still obtaining movement of the carriage to the right at a feed rate is made possible by provision of the holding circuit for the feed right contactor coil, such circuit being governed as above described by the holding relay HRC which in return is under the control of the limit switch LS and the delayed action switch TRS of the timer relay.

As mentioned earlier, when the positive stop screw 130 engages the stop member 131 movement of the table stops, the feed motor continuing to run and the feed motor rotating the traverse motor because of the reduced torque on the brake caused by the removal of the shunt circuit 127. Consequently the table dwells in this position until the first timer drops out and switch TRS opens.

After the desired dwell, determined by the setting of the first timer relay, the timer relay switch TRS opens, breaking the circuit to the coil HRC of the holding relay and thereby opening the switch HRS1 in the holding circuit for the feed right contactor coil, and with deenergization of this coil the feed right contactor will be operated, opening the three switches FRC and closing the switches FRCS and FRC'. Similarly, closing of the holding relay switch HRS3 conditions the apparatus for the energization of the traverse contactor coil TCC and the second timer relay coil 2TRC. In addition, circuits had previously been conditioned as above described for energization of the feed left contactor coil and the traverse contactor coil. With return of the feed right contactor FRC to its normal position (including closure of the switch FRCS) and with the closure of the switch HRS3 these preconditioned circuits will be completed to the feed left and to the traverse contactor coils. Thereupon, both the feed left contactor and the traverse contactor coils will be energized and these contactors will be operated, closing the switches FLC and opening the switches FLC' and FLCS associated with the feed left contactor and closing the switches TC and opening the switch TC' associated with the traverse contactor.

When the switch TC' opens as above described the circuit to the rapid brake electromagnet coil 97 will be opened and the brake will be completely released. As the carriage moves to the left at a traverse rate the dog D4 will no longer exercise control over the limit switch LS which will then return to its normal open position and the first timer relay will restore its switch TRS to its normally closed position. When the carriage reaches its normal or starting position, the dog D3 will actuate the plunger 94 to break the holding circuit for the coil SRC of the starting relay, which will in turn cause the switch SRS to open, breaking the circuits to the feed left and traverse contactor coils and the carriage will come to rest in its final position with the switches in the position shown in Fig. 2. In this position the rapid brake electromagnet coil 45 is energized since the switch TC' is closed, and the feed brake electromagnet coil 52 is also energized since the switches FRC' and FLC' are closed, thus insuring full braking torque to stop both motors.

The form of the invention disclosed in Fig. 3 differs from that disclosed in Fig. 2 in the elimination of one of the timer relays and in providing an arrangement whereby the torque on the brake is not reduced until the dog D4 contacts the dwell timer or limit switch LS near the end of the feed portion of the cycle. Inasmuch as the brake is not required to slip until the positive stop means are engaged, and inasmuch as the dog D4 contacts the dwell timer switch before the positive stop means are engaged, the fact that full torque is applied to the traverse motor during most of the feed portion of the cycle is of no import so long as the torque is reduced to a point where it is low enough to permit the brake to slip to relieve the load on the feed motor during the time the table is positively stopped.

In the form of the invention disclosed in Fig. 3 the second timer including the coil 2TRC and the normally open switch 2TRS have been omitted. The remaining timer comprises a coil TRC' similar to the coil TRC of Fig. 2 and connected into the circuit in exactly the same manner, the lead 128 connecting one end of said coil with the lead 117 and connecting the other end of said coil with the line wire L3 through portions of the leads 110, 109 and 108 so that the coil TRC' is energized when the dog D4 closes the limit or dwell timer switch LS and is deenergized when this switch is opened in the same manner as the coil TRC of Fig. 2. The timer includes a normally closed switch TRS' which is similar in operation to the switch TRS of Fig. 2 and which does not open immediately upon energization of the associated coil TRC', but which opens after a time delay determined by the setting of the timer. This switch is incorporated in the lead 117 and forms part of the energizing circuit for the coil HRC, the amount of time delay determining the dwell period of the machine.

The lead 127 which forms a shunt or shorting circuit around the torque adjustment resistor 126 includes a normally closed switch 2TRS' which is similar in function to the switch 2TRS of the second timer of Fig. 2. The switch 2TRS' does not have time delayed action, but is operated by a direct mechanical connection to the armature of the timer relay so that when the relay is deenergized the switch is in its normal closed position, and the switch is opened whenever the coil TRC' is energized. Consequently, under normal conditions the lead 127 forms a short around the resistor 126 and if the rapid brake electromagnet coil 45 is not energized the full voltage of the rectifier 98 is applied across the coil 45 and maximum braking torque is applied. However, if the coil 45 is energized to brake the traverse motor and the timer relay coil TRC' is energized the switch 2TRS' opens and breaks the lead 127, and part of the voltage output from the rectifier 98 is developed across the resistor 126 so that braking torque is reduced. In this event the amount of braking torque may be readily adjusted by movement of the slider 126a in a manner earlier described.

In the operation of the system of Fig. 3 the operation is exactly the same as that described in connection with Fig. 2 down to the point where the feed portion of the cycle is initiated. When the dog D2 engages the follower 80 and rocks the shaft 71 of the unitary controller to its feed right position, the traverse contactor coil TCC is deenergized in the manner described in connection with the operation of the apparatus of Fig. 2, and the switch TC' closes, completing the circuit to energize the rapid brake electromagnet coil 45. Since the timer relay coil TRC' is not energized (the limit switch LS being open) the lead 127 is closed and forms a short around the resistor 126 and full braking torque is applied to stop the traverse motor and insure that the table immediately slows down to its desired feed rate of travel. The apparatus remains in this condition until the dog D4 closes the limit switch LS, energizing the timer relay coil TRC' and the holding relay coil HRC. When this action occurs the switch 2TRS' opens immediately, breaking the lead 127 and the torque of the brake is reduced since part of the voltage output of the rectifier 98 is now developed across the resistor 126. The switch TRS', however, remains closed during the period for which the timer is set to provide the dwell period of the machine, and the table continues to move to the right until the positive stop screw 130 engages the stop member 131. When the timer operates to open the switch TRS' and terminate the dwell period the motors TM and FM are caused to reverse in the manner described in connection with Fig. 2 and the table moves to the left at a traverse rate. As earlier described this movement frees the limit switch LS and this switch returns to its normal open position, breaking the circuit to the timer relay coil TRC' so that the switch 2TRS' closes, conditioning the braking apparatus to apply full torque when the brake coils are energized at the termination of the cycle.

We claim:

1. In a machine having a reciprocable carriage, a positive mechanical stop for limiting movement of the carriage in one direction and means for driving the carriage at feed and traverse rates including a first reversible electric motor, a second reversible electric motor, a planetary gear system operatively interposed between the motors and the carriage to drive the carriage at a feed rate when only the first motor is operating and at a traverse rate when the second motor is operating, friction brake means for said first motor including a first electromagnet coil and a first variable resistance in series therewith, friction brake means for said second motor for holding said second motor against rotation while the carriage is being driven at a feed rate, said brake including a second electromagnet coil, a second variable resistance in series therewith and a shunt circuit connected across said second resistance, an electric control system comprising means for deenergizing both coils to control operation of the motors to obtain movement of the carriage in one direction at a traverse rate, means operable at a predetermined point in said movement to deenergize said second motor and energize said second coil through said shunt circuit to apply said brake to said second motor to stop rotation of said motor and cause said carriage to move at a feed rate, a timer relay having a first normally closed switch connected in said shunt circuit and a second normally closed switch arranged to open after a time delay when said relay is energized, means operable as the carriage approaches the limit of its movement in the one direction to energize said relay to precondition the system for movement of the carriage in the opposite direction after said time delay while maintaining movement in the first direction until the carriage engages said stop, energization of said relay opening said first switch to break said shunt circuit for reducing the braking torque on said second motor to cause the brake to slip and permit said first motor to drive the second motor when said carriage engages the stop, the reduced torque being high enough to prevent the first motor from driving the second motor before the carriage engages the stop, variation of said first resistance determining the braking torque on said first motor when the first coil is energized, and variation of said second resistance determining the braking torque on said second motor when said second coil is energized and said first switch is open.

2. In a machine having a reciprocable carriage, a positive mechanical stop for limiting movement of the carriage in one direction and means for driving the carriage at feed and traverse rates including a first reversible electric motor, a second reversible electric motor, a planetary gear system operatively interposed between the motors and the carriage to drive the carriage at a feed rate when only the first motor is operating and at a traverse rate when the second motor is operating, friction brake means for said second motor including an electromagnet coil, an electric control system comprising means controlling operation of the motors to obtain movement of the carriage in one direction at a traverse rate, means operable at a predetermined point in said movement to deenergize said second motor and energize said coil to apply the brake to stop rotation of said second motor and cause said carriage to move at a feed rate, a timer relay having a first normally closed switch connected to said coil and a second normally closed switch arranged to open after a time delay when said relay is energized, means operable as the carriage approaches the limit of its movement in the one direction to energize said relay to precondition the system for movement of the carriage in the opposite direction after said time delay while maintaining movement in the first direction until the carriage engages said stop, energization of said relay opening said first switch to reduce the braking torque without releasing the brake to cause the brake to slip and permit said first motor to drive the second motor when said carriage engages the stop, the reduced torque being high enough to prevent the first motor from driving the second motor before the carriage engages the stop, and means for readily adjusting the braking torque when said coil is energized and said first switch is open.

3. In a machine having a movable carriage, a positive mechanical stop for limiting movement of the carriage in one direction and means for driving the carriage at feed and traverse rates including a first electric motor, a second electric motor, differential drive means operatively interposed between the motors and the carriage to drive the carriage at a feed rate when only the first motor is operating and at a traverse rate when the second motor is operating, friction brake means for said second motor for holding said second motor against rotation while said carriage is being driven at a feed rate, an electric control system comprising means controlling operation of the motors to obtain movement of the carriage in one direction at a traverse rate, means operable at a predetermined point in said movement to deenergize said second motor and apply said brake to cause said carriage to move at a feed rate, a timer relay having a first switch associated with said brake and a second switch which is normally closed and is arranged to open after a time delay when said relay is energized, and means operable as the carriage approaches the limit of its movement in the one direction to energize said relay to precondition the system for movement of the carriage in the opposite direction after said time delay while maintaining movement in the first direction until the carriage engages said stop, energization of said relay operating said first switch to reduce the braking torque without releasing the brake to cause the brake to slip and permit said first motor to drive the second motor when said carriage engages the stop, the reduced torque being high enough to prevent the first motor from driving the second motor before the carriage engages the stop.

4. In a machine having a reciprocable carriage, a positive mechanical stop for limiting movement of the carriage in one direction and means for driving the carriage at feed and traverse rates including a first reversible electric motor, a second reversible electric motor, a planetary gear system operatively interposed between the motors and the carriage to drive the carriage at a feed rate when only the first motor is operating and at a traverse rate when the second motor is operating, friction brake means for said first motor including a first electromagnet coil and a first variable resistance in series therewith, friction brake means for said second motor including a second electromagnet coil and a second variable resistance in series therewith, torque control means for said second brake including a timer relay having a switch associated therewith and connected in a circuit in shunt with said second variable resistance, said switch being closed when said relay is energized and being arranged to open after a time delay when said relay is deenergized, an electric control system comprising means for energizing said relay and for deenergizing both coils to control operation of the motors to obtain movement of the carriage in one direction at a traverse rate, means operable at a predetermined point in said movement to deenergize said relay and said second motor and energize said second coil through said shunt circuit to apply said brake to said second motor to cause said carriage to move at a feed rate, said switch opening after said time delay to break said shunt circuit for reducing the braking torque on said second motor to cause the brake to slip and permit said first motor to drive the second motor when said carriage engages the stop, the reduced torque being high enough to prevent the first motor from driving the second motor before the carriage engages the stop, means operable as the carriage approaches the limit of its movement in the one direction to precondition the controlling means for reverse movement of the carriage while maintaining movement in the first direction, and a second timer relay for initiating drive of the carrage in the opposite direction under the control of said preconditioned means, variation of said first resistance determining the braking torque on said first motor when the first coil is energized, and variation of said second resistance determining the braking torque on said second motor when said second coil is energized and said switch is open.

5. In a machine having a reciprocable carriage, a positive mechanical stop for limiting movement of the carriage in one direction and means for driving the carriage at feed and traverse rates including a first reversible electric motor, a second reversible electric motor, a planetary gear system operatively interposed between the motors and the carriage to drive the carriage at a feed rate when only the first motor is operating and at a traverse rate when the second motor is operating, friction brake means for said second motor including an electromagnet coil, torque control means for said brake including a timer relay having a switch associated therewith, said switch being closed when said relay is energized and being arranged to open after a time delay when said relay is deenergized, an electric control system comprising means for energizing said relay and for controlling operation of the motors to obtain movement of the carriage in one direction at a traverse rate, means operable at a predetermined point in said movement to deenergize said relay and said second motor and energize said coil to apply said brake to cause said carriage to move at a feed rate, means associated with said brake for reducing the braking torque without deenergizing said coil upon the opening of said switch after said time delay to cause the brake to slip and permit said first motor to drive the second motor when said carriage engages the stop, the reduced torque being high enough to prevent the first motor from driving the second motor before the carriage engages the stop, means operable as the carriage approaches the limit of its movement in the one direction to precondition the controlling means for reverse movement of the carriage while maintaining movement in the first direction, and a second timer relay for initiating drive of the carriage in the opposite direction under the control of said preconditioned means.

6. In a machine having a movable carriage, a positive mechanical stop for limiting movement of the carriage in one direction and means for driving the carriage at feed and traverse rates including a first electric motor, a second electric motor, differential drive means operatively interposed between the motors and the carriage to drive the carriage at a feed rate when only the first motor is operating and at a traverse rate when the second motor is operating, friction brake means for said second motor for holding said second motor against rotation when the carriage is being driven at a feed rate, torque control means for said brake including a timer relay having a switch associated therewith, said switch being closed when said relay is energized and being arranged to open after a time delay when said relay is deenergized, an electric control system comprising means for energizing said relay and for controlling operation of the motors to obtain movement of the carriage in one direction at a traverse rate, means operable at a predetermined point in said movement to deenergize said relay and said second motor and apply said brake to cause said carriage to move at a feed rate, means associated with said brake for reducing the braking torque without releasing the brake upon the opening of said switch after said time delay to cause the brake to slip and permit said first motor to drive the second motor when said carriage engages the stop, the reduced torque being high enough to prevent the first motor from driving the second motor before the carriage engages the stop.

7. In a machine having a reciprocable carriage, a positive mechanical stop for limiting movement of the carriage in one direction and means for driving the carriage at feed and traverse rates including a first reversible electric motor, a second reversible electric motor, a planetary gear system operatively interposed between the motors and the carriage to drive the carriage at a feed rate when only the first motor is operating and at a traverse rate when the second motor is operating, friction brake means for said first motor including a first electromagnet coil and a first variable resistance in series therewith, friction brake means for said second motor including a second electromagnet coil, a second variable resistance in series therewith and a shunt circuit including a switch connected across said second resistance, an electric control system comprising means for deenergizing both coils to control operation of the motors to obtain movement of the carriage in one direction at a traverse rate, means operable at a predetermined point in said movement to deenergize said second motor and energize said second coil through said shunt circuit to apply said brake to said second motor to cause said carriage to move at a feed rate, means for opening said switch to break said shunt circuit for reducing the braking torque on said second motor to cause the brake to slip and permit said first motor to drive the second motor when said carriage engages the stop, the reduced torque being high enough to prevent the first motor from driving the second motor before the carriage engages the stop, means operable as the carriage approaches the limit of its movement in the one direction to precondition the controlling means for reverse movement of the carriage while maintaining movement in the first direction, and timing means initiating drive of the carriage in the opposite direction under the control of said preconditioned means, variation of said first resistance determining the braking torque on said first motor when the first coil is energized, and variation of said second resistance determining the braking torque on said second motor when said second coil is energized and said switch is open.

8. In a machine having a reciprocable carriage, a positive mechanical stop for limiting movement of the carriage in one direction and means for driving the carriage at feed and traverse rates including a first reversible electric motor, a second reversible electric motor, a planetary gear system operatively interposed between the motors and the carriage to drive the carriage at a feed rate when only the first motor is operating and at a traverse rate when the second motor is operating, friction brake means for said first motor including a first electromagnet coil and a first variable resistance in series therewith, friction brake means for said second motor including a second electromagnet coil and a second variable resistance in series therewith, an electric control system comprising means for deenergizing both coils and for controlling operation of the motors to obtain movement of the carriage in one direction at a traverse rate, means operable at a predetermined point in said movement to deenergize said second motor and energize said second coil to apply said brake to said second motor to stop said second motor from rotating and cause said carriage to move at a feed rate, means operable during such feed movement for reducing the braking torque on said second motor without deenergizing said second coil to cause the brake to slip and permit said first motor to drive the second motor when said carriage engages the stop, the reduced torque being high enough to prevent the first motor from driving the second motor before the carriage engages the stop, means operable as the carriage approaches the limit of its movement in the one direction to precondition the controlling means for reverse movement of the carriage while maintaining movement in the first direction, and timing means initiating drive of the carriage in the opposite direction under the control of said preconditioned means.

9. In a machine having a reciprocable carriage, a positive mechanical stop for limiting movement of the carriage in one direction and means for driving the carriage at feed and traverse rates including a first reversible electric motor, a second reversible electric motor, a planetary gear system operatively interposed between the motors and the carriage to drive the carriage at a feed rate when only the first motor is operating and at a traverse rate when the second motor is operating, friction brake means for said second motor for preventing rotation of said motor while the carriage is being driven at a feed rate, said brake including an electromagnet coil, a resistance in series therewith and a shunt circuit including a switch connected across said resistance, an electric control system comprising means controlling operation of the motors to obtain movement of the carriage in one direction at a traverse rate, means operable at a predetermined point in said movement to deenergize said second motor and energize said coil through said shunt circuit to apply said brake to stop rotation of said second motor and cause said carriage to move at a feed rate, means operable during such feed movement for opening said switch to break said shunt circuit for reducing the braking torque to cause the brake to slip and permit said first motor to drive the second motor when said carriage engages the stop, the reduced torque being high enough to prevent the first motor from driving the second motor before the carriage engages the stop, means operable as the carriage approaches the limit of its movement in the one direction to precondition the controlling means for reverse movement of the carriage while maintaining movement in the first direction, and timing means initiating drive of the carriage in the opposite direction under the control of said preconditioned means.

10. Apparatus of the character claimed in claim 9, wherein said resistance is variable for readily adjusting the reduced torque to a value where it prevents the first motor from driving the second motor before the carriage engages the stop.

11. In a machine having a reciprocable carriage, a positive mechanical stop for limiting movement of the carriage in one direction and means for driving the carriage at feed and traverse rates including a first reversible electric motor, a second reversible electric motor, a planetary gear system operatively interposed between the motors and the carriage to drive the carriage at a feed rate when only the first motor is operating and at a traverse rate when the second motor is operating, friction brake means for said second motor for preventing rotation of the second motor while the carriage is being driven at a feed rate, said brake including an electromagnet coil, an electric control system comprising means controlling operation of the motors to obtain movement of the carriage in one direction at a traverse rate, means operable at a predetermined point in said movement to deenergize said second motor and energize said coil to apply said brake to cause said carriage to move at a feed rate, means operable during such feed movement for reducing the braking torque without deenergizing said coil to cause the brake to slip and permit said first motor to drive the second motor when said carriage engages the stop, the reduced torque being high enough to prevent the first motor from driving the second motor before the carriage engages the stop, means operable as the carriage approaches the limit of its movement in the one direction to precondition the controlling means for reverse movement of the carriage while maintaining movement in the first direction, and timing means initiating drive of the carriage in the opposite direction under the control of said preconditioned means.

12. In a machine having a movable carriage, a positive mechanical stop for limiting movement of the carriage in one direction and means for driving the carriage at feed and traverse rates including a first electric motor, a second electric motor, differential drive means operatively interposed between the motors and the carriage to drive the carriage at a feed rate when only the first motor is operating and at a traverse rate when the second motor is operating, friction brake means for said second motor including an electromagnet coil, an electric control system comprising means controlling operation of the motors to obtain movement of the carriage in one direction at a traverse rate, means operable at a predetermined point in said movement to deenergize said second motor and energize said coil to apply said brake to stop rotation of said second motor and cause said carriage to move at a feed rate, and means operable during such feed movement for reducing the frictional braking torque by reducing the voltage across said coil without deenergizing said coil to cause the brake to slip and permit said first motor to drive the second motor when said carriage engages the stop, the reduced torque being high enough to prevent the first motor from driving the second motor before the carriage engages the stop.

13. In a machine having a movable carriage, a positive mechanical stop for limiting movement of the carriage in one direction and means for driving the carriage at feed and traverse rates including a first electric motor, a second electric motor, differential drive means operatively interposed between the motors and the carriage to drive the carriage at a feed rate when only the first motor is operating and at a traverse rate when the second motor is operating, friction brake means for said second motor, an electric control system comprising means controlling operation of the motors to obtain movement of the carriage in one direction at a traverse rate, means operable at a predetermined point in said movement to deenergize said second motor and apply said brake to stop rotation of said second motor and cause said carriage to move at a feed rate, and means operable during such feed movement for reducing the frictional braking torque without releasing the friction brake to cause the brake to slip and permit said first motor to drive the second motor when said carriage engages the stop, the reduced torque being readily adjustable to a value where it prevents the first motor from driving the second motor before the carriage engages the stop.

14. In a machine having a movable carriage, a positive mechanical stop for limiting movement of the carriage in one direction and means for driving the carriage at feed and traverse rates including a first electric motor, a second electric motor, means operatively interposed between the motors and the carriage to drive the carriage at a feed rate when only the first motor is operating and at a traverse rate when the second motor is operating, friction brake means for said second motor for holding said motor against rotation while the carriage is being driven at a feed rate, an electric control system comprising means controlling operation of the motors to obtain movement of the carriage in one direction at a traverse rate, means operable at a predetermined point in said movement to deenergize said second motor and apply said brake to cause said carriage to move at a feed rate, and means operable during such feed movement for reducing the frictional braking torque without releasing the friction brake to cause the brake to slip and permit said first motor to drive the second motor when said carriage engages the stop, the reduced torque being high enough to prevent the first motor from driving the second motor before the carriage engages the stop.

BENGT R. GRANBERG.
BERTIL T. ANDERSON.

REFERENCES CITED

The following references are of record in the file of this patent:

UNITED STATES PATENTS

| Number | Name | Date |
|---|---|---|
| 2,398,346 | Anderson | Apr. 16, 1946 |